Patented Aug. 2, 1932

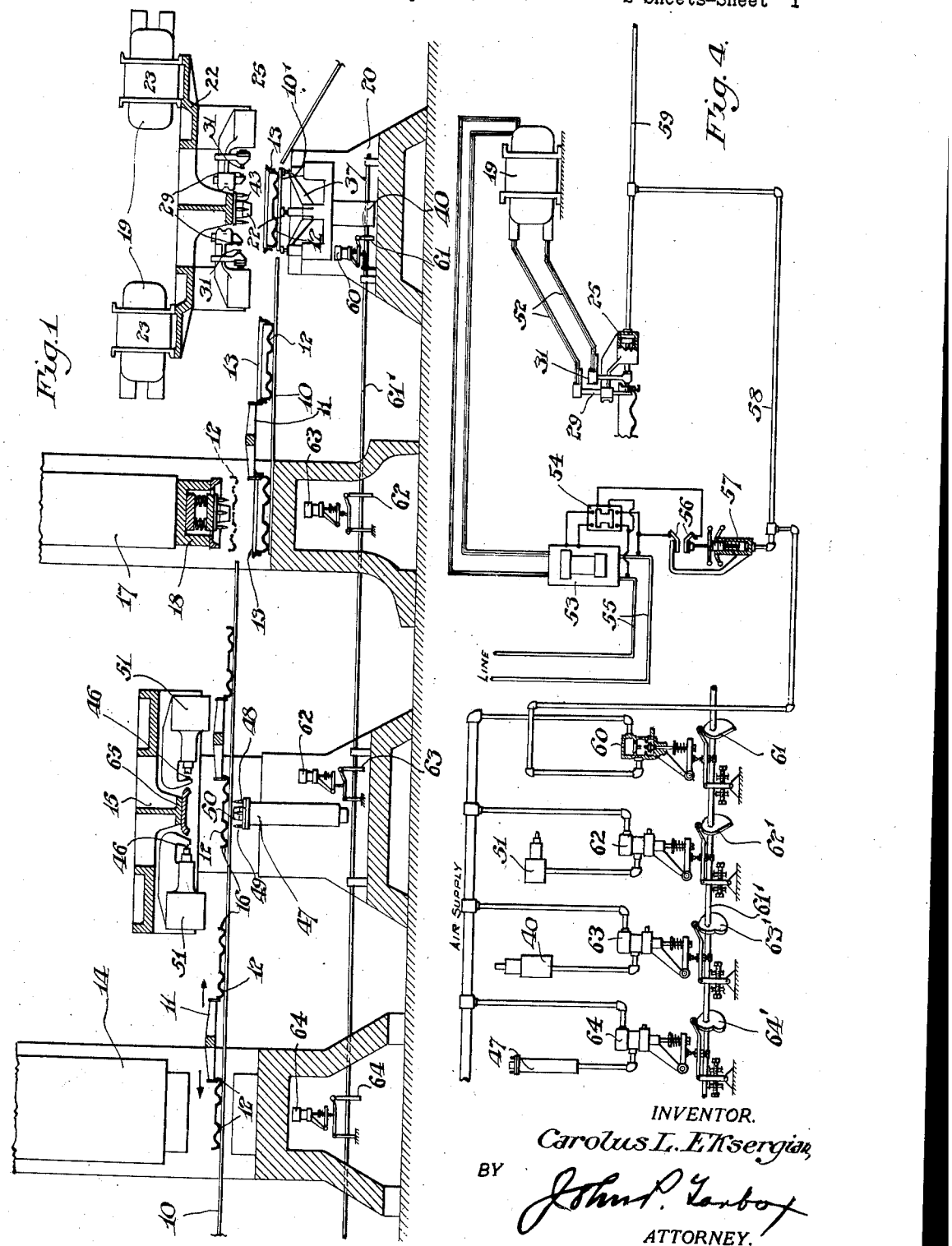

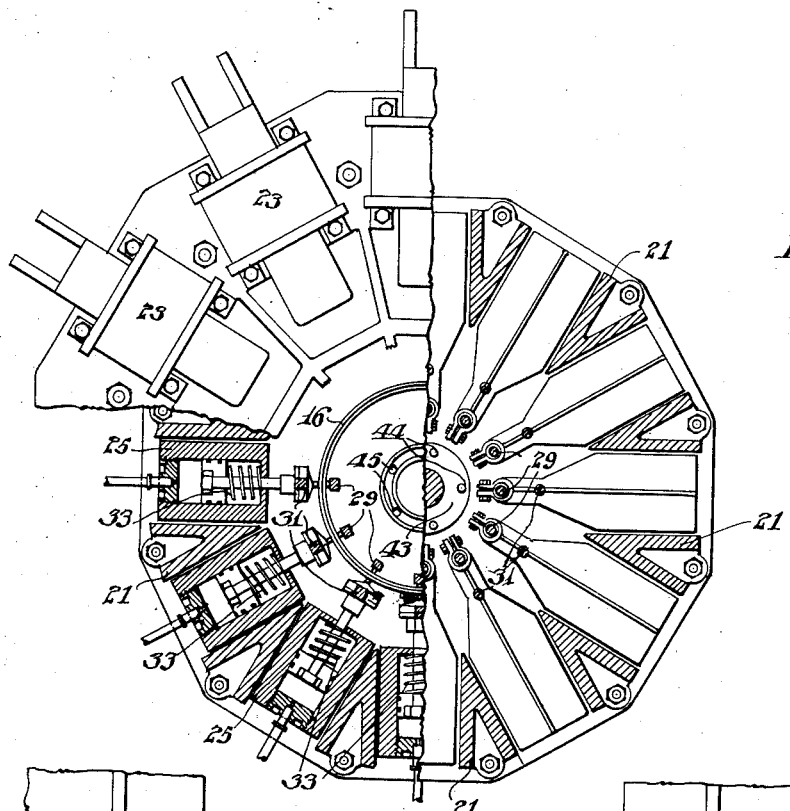

1,869,804

UNITED STATES PATENT OFFICE

CAROLUS L. EKSERGIAN, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

APPARATUS FOR WELDING WHEELS TO RIMS

Application filed April 6, 1928. Serial No. 267,831.

My invention relates to welding machines of a type adapted especially for embodiment in connection with the automatic wheel fabricating machinery. Such machinery embodies a number of machines adapted each to perform a particular operation upon a wheel arranged about the path of operation of a work conveyor in such manner that as the work is conveyed along the path, the various operations necessary to produce a wheel are sequentially performed by the machine as the pieces of work are progressed from one machine to another. It has heretofore been the common practice to rivet the bodies of wheels to their rims after the fabricating and assembling operations of the parts are complete, and after the wheels leave the conveyor path. But the welding machine in the copending application of one James W. Hughes for wheel welding machine, Serial No. 250,557, filed Jan 30, 1928, is combined with a conveyor in such manner that the pre-assembled bodies and rims of wheels are welded together before they leave the path of the conveyor. My machine is an improvement on the Hughes machine.

The Hughes machine embodies a welding machine head carrying transformers, electrodes, actuating means therefor, etc., and the parts which it carries are bodily reciprocable toward and from the path of the conveyor, in order to engage and disengage the electrodes of the machine with the work carried by the conveyor. This head and the connected parts are relatively extremely heavy. It is the principal object of my invention to avoid moving these extremely heavy parts relative to the conveyor.

I attain this object of my invention by juxtaposing the welding machine head and connected electrodes, etc., to the conveyor path at a distance therefrom which does not interfere with the progress of the wheels to be welded along the path, and so constructing the conveyor that the wheels conveyed to the welding machine may be moved laterally of the path of the conveyor toward and from the welding electrodes. The wheel to be welded itself is of extremely light weight as compared with the great weight of the welding machine head, transformers, electrodes, actuating means, etc. The relative movement is therefore carried out with less power, and with a considerably greater rapidity, thus resulting in a more economical and a higher rate of operation.

In the preferred form of my invention which I show in the accompanying drawings, I construct the conveyor in such manner that the portion of it to which the welding machine head and associated parts are juxtaposed, is itself relatively movable with respect to the welding head, carrying the work which lies thereon with it. This movement I effect preferably through a compressed air cylinder or other device actuated in synchronism with the conveyor and welding machine movement.

My invention has to do also in improvements in the controls of the welding machine, improvements embodying an electropneumatic apparatus which, as is well known, is especially adapted for producing high speed control.

Of the drawings,

Fig. 1 is a general longitudinal elevation, partially in section, of a portion of the automatic line of wheel fabricating machinery in which the apparatus of my invention has been embodied.

Fig. 2. is an enlarged longitudinal vertical section of the apparatus of my invention.

Fig. 3 is a plan view of a portion of the welding head of the machine with various parts shown cut away and in section.

Fig. 4 is a diagrammatic illustration of the electro-pneumatic control.

Referring now to the drawings, 10 designates the conveyor trackway. Horizontal reciprocating arms 11 are arranged over this trackway to progress the wheel parts from left to right over the horizontal path of conveyor movement established by the trackway 10. This trackway and the arms 11 are arranged substantially as in the copending application of James W. Hughes, filed June 3, 1925, Serial No. 34,743. A number of wheel bodies in the form of discs 12 are indicated along the path of track 10. Those at the right hand end of the track 10 are shown in assembled relation with respect to the wheel rims 13 to which they are to be joined by electric welding. A machine 14 on the left diagrammatically represents the last machine of the automatic fabricating line performing a machine operation upon the wheel bodies 12.

A machine 15 diagrammatically represents a compressed air indenting machine adapted to form spuds in the flanges 16 of the wheel discs 12 to get them ready for the welding operation.

The machine 17 diagrammatically represents the assembly press in which discs, the peripheral flanges of which have been provided with spuds by machine 15, are assembled with the rims 13. At this machine 17 the track 10 is deflected vertically in such manner that the machine 17 is at a lower level than the preceding trackway 10, and a disc 12 fed by the conveyor to machine 17 as shown in dotted lines, in that machine, is projected over the top of a rim 13 preplaced in that machine and may thereupon be pushed into that rim by the reciprocating punch 18 of the machine. The machine 19 in combination with the portion of the conveyor 10 with respect to which it is juxtaposed is my chief invention. However, it will be seen that certain other features I have described and will describe also constitute a part of my invention.

This machine 19 comprises a relatively fixed base 20 having right and left columns 21 which rise therefrom respectively on opposite sides of the trackway 10 defining the conveyor path. These columns support in approaching relation to the path of the wheels on trackway 10, the annular welding head 22. (See Fig. 2.) On top of this head are supported about a central axis 22' passing through the center of the conveyor path as defined by track 10, an annular series of welding transformers 23. Beneath the head are mounted in radially extending guideways 24 about the same axis and having relative sliding movement with respect to the axis, a plurality of fluid pressure actuating cylinders 25. These cylinders contain pistons and piston rods, respectively designated 26, 27. Projecting axially inwardly of the cylinders 25 are overhanging arms 28 carrying vertically adjustable electrodes 29. On the ends of the piston rods 27 are heads 30 carrying similarly vertically adjustable electrodes 31 in the same radial plane as electrodes 29. Electrodes 31 are reciprocable by the cylinders 25 but are retained in vertical alignment by splines 32 between rods 27 and the cylinders 25. Springs 33 serve to retract the fluid operated pistons 26. Connections with the transformer are by means of terminal blocks 34, 35, respectively clamped to the tops of electrodes 29 and 31 and relatively movable therewith. Cooling fluid for the electrodes is introduced through connections 36 from suitable sources of cooling fluid.

The section 10' of trackway 10 lying immediately below the annular series of electrodes 29, 31 is mounted for vertical reciprocation on axes 22' as clearly appears in Figure 2. The mounting is on a spider 37 carried on the end of rod 38 connected with piston 39 in a fluid pressure actuating cylinder 40, likewise on the axis 22', but located in the base of the machine 19 on the opposite side of trackway 10 from the juxtaposed and relatively fixed welding head 22. Radial alignment is maintained during vertical reciprocation of track section 10' by rods and sockets 41, 42, respectively associated with the spider 37 and the base 20. The stroke of the cylinder 40 is such that the work conveyed to the machine 19 is projected from a determinate path of the conveyor, laterally thereof, vertically upward into proper relation to the electrodes 29, 31 to be welded and then returned to the path of the conveyor for further progress, in which progress it is discharged from the machine. This movement to the electrodes is limited by an adjustable limiting head 43 depended from the welding head 22 on the axis 22'. This head is adjustable by shimming or otherwise, as, for example, by varying the sizes of the head itself. Further, the carrier pins or other guiding means 44 are adapted to enter bolt holes 45 in the work and accurately position the work angularly with respect to the electrodes, in such manner that the spuds 45' formed in the machine 15 are accurately positioned opposite the electrodes 29, 31.

Referring to Fig. 1, it will be seen that the arrangement of the spud forming machine 15 with respect to the path of movement of conveyor 10, is relatively the same as that of the welding machine 19, but the section of the trackway 10 to which the spud forming dies 46 are juxtaposed is not relatively movable. Instead, a fluid operated cylinder 47 carries a head 48 provided with pins 49 and a central boss 50 which enter the bolt holes and the central aperture of the wheel body 12, respectively when cylinder 47 is actuated. Such engagement of the wheel body by the elements 49, 50 bodily transfers the wheel body 12 upwardly into position to be operated upon by the dies 46 and at the same time radially aligns it in precisely the relation to the dies 46 the spuds to be formed are to bear to the pins 44 on the head 43 of the machine 19. Spud-forming fluid pressure cylinders 51 of the machine 15 are arranged for actuation and adjustment in essentially the same way as are cylinders 25 of the machine 19. Referring now more particularly to Fig. 4 it will be seen that the secondaries of the transformers are connected directly to the electrodes 29, 31 through the leads 52. The primaries, however, are connected in common to a line connection switch 53. This switch is an electro-magnetic switch controlled as diagrammatically shown from a small relay switch 54 also operated from the line 55. This relay switch has its electro-magnetic actuator controlled by pneumatically operated contacts 56. The pneumatic operation is by a pressure device 57 receiving its power by connection 58 with the source of fluid pressure 59 common to all the fluid pressure cylinders 25. The application of fluid pressure to this common connection 59 is by means of a fluid pressure control valve 60. This valve 60 is cam operated adjustably from the timing shaft 61' of the automatic fabricating line at large. This timing shaft extends from machine to machine as indicated diagrammatically in Fig. 1 and controls through connections not necessarily shown here the coordinated operation of the machines which make up the line. From it also are controlled other valves 62, 63, 64, respectively governing the actuation, in properly timed relation, of the cylinders 51 of the spud forming machine 15, and the cylinders 40 and 47 of the wheel transfer mechanisms of the machines 19 and 15, respectively. These two latter, as indicated diagrammatically by the different shapes of the cams 63' and 64', operate in a different time relation from the welding and spud forming operations controlled by the two cams 61 and 62', since the work needs to be moved to and removed from the machines 15 and 19 before and after the operation of those machines, respectively.

The operation is simply as follows. As the wheel bodies 12 which constitute the work pieces are removed by the arms 11 from the machine 14, they are progressed along the track 10 first to the spud forming machine 15. As the work piece 12 dwells over the transfer head 48 cam 64' admits fluid to cylinder 47. It projects the properly aligned wheel body 12 into position to be worked upon by the spud forming dies 46. Wheel body 12 is clamped between the head 48 and the depending mating head 65 of the machine. Immediately following, fluid pressure is admitted by valve 62 to cylinders 51 and the spuds are formed. The fluid pressure being released by valve 62, the dies 46 are separated from the work and immediately thereafter the valve 64 relieves cylinder 47 of fluid pressure and the wheel body 12 is returned to its path of movement on track 10. Ensuing movement of reciprocating arms 11 progress the wheel bodies from machine 15 to the assembling machine 18 in which the path of the wheel body is deflected to a lower plane and the assembly with the rim takes place. The wheels are then progressed to the welding machine.

In position on the transversely movable portion 10' of the track 10 the assembled wheel 12, 13 is at once projected upwardly into engagement with the cooperating clamping and aligning head 43, through the actuation of valve 63 from its cam on shaft 61. So clamped and aligned, it is engaged and operated upon by the electrodes 29, 31. Immediately following the clamping of the wheel in this position valve 60 is operated to admit fluid pressure to actuating cylinders 25 of these electrodes. It will be observed that these cylinders operate the electrodes to mechanically engage and exert pressure upon the opposite sides of the work in line with the pre-formed spuds. But the connection of the transformers with the line 55 is delayed for a moment. This is because the application of fluid pressure to the common connection 59 must needs make its way through the fluid pressure relay 57 to the contacts 56 and thence through electro-magnetic control switch 53. This introduces an appropriate time interval for all the electrodes to effect proper mechanical engagement in pressure before the welding current is applied. This time interval is adjustable through adjustment of the pneumatic and electric relays 57, 54, respectively, in well known manners. The welds being completed, valve 60 is opened to relieve connection 59 of its fluid pressure, and the current is cut off from the transformers and the electrodes apart from the work.

The disconnection of the transformers from the line incident to the release of welding pressure takes place, before the electrodes can part with the work, since the electro-pneumatic device 57 while it has a slow forward stroke, has an extremely quick back stroke. This device is well known in the art. Following this exhaust of fluid pressure from connection 59, the electrodes having parted from the work, valve 63 is again energized from its cam this time to relieve cylinder 40 of its pressure and to return the completed work 12, 13 and the track-way section 10' to the path of the conveyor whereupon it progresses in its completed form out of the machine 19.

The invention is capable of innumerable modifications without departing in any wise from its generic spirit. The invention consists in the organization and in functioning of parts rather than in the parts themselves. There are many parts known to engineers having forms different but functions similar to those shown.

In the annexed claims I would cover the generic organization and relations of parts irrespective of the forms of those parts.

What I claim is:

1. A welding machine comprising a work conveyor operating to convey the work to be welded upon a determinate path, a plurality of welding electrodes in relatively fixed juxtaposition to the path, means to shift the work from the path to the electrodes and back again, and means to operate the welding electrodes and close the welding circuit in synchronism with said shifting means.

2. A machine of the character described, comprising a work conveyor, a relatively fixed welding machine juxtaposed to the conveyor, means to shift a portion of the conveyor toward and from the welding machine to carry the work to and from the machine, and means for operating the welding machine in synchronism with said shifting means.

3. A machine of the character described comprising a work conveyor operating upon a determinate path, a relatively fixed welding machine head juxtaposed thereto, a plurality of floating electrodes carried by said head and mounted for radial floating movement with respect to the work, means to move the work to and from the floating electrodes, and means for operating the welding machine in synchronism with said moving means.

4. A machine of the character described comprising in combination, a work conveyor and a relatively fixed welding machine head, together with a plurality of radially sliding electrodes arranged about a common axis thereon, means operating on the same axis to project work to and from the welding electrodes from the conveyor, and means for operating said electrodes in synchronism with said work projecting means.

5. In an apparatus of the character described, a work conveyor operating on a path having different levels, and a work assembly machine on said path at the junction of the different levels and in the operation of which machine there enters the conveying of the work from the one level to the other.

6. A welding machine comprising a work conveyor operating to convey the work to be welded upon a determinate path, a plurality of welding electrodes in relatively fixed juxtaposition to the path, and means to shift the work from the path to the electrodes and back again, together with electrode actuating means synchronized to operate in properly timed relation with the work shifting means.

In testimony whereof he hereunto affixes his signature.

CAROLUS L. EKSERGIAN.